United States Patent Office 2,736,338
Patented Feb. 28, 1956

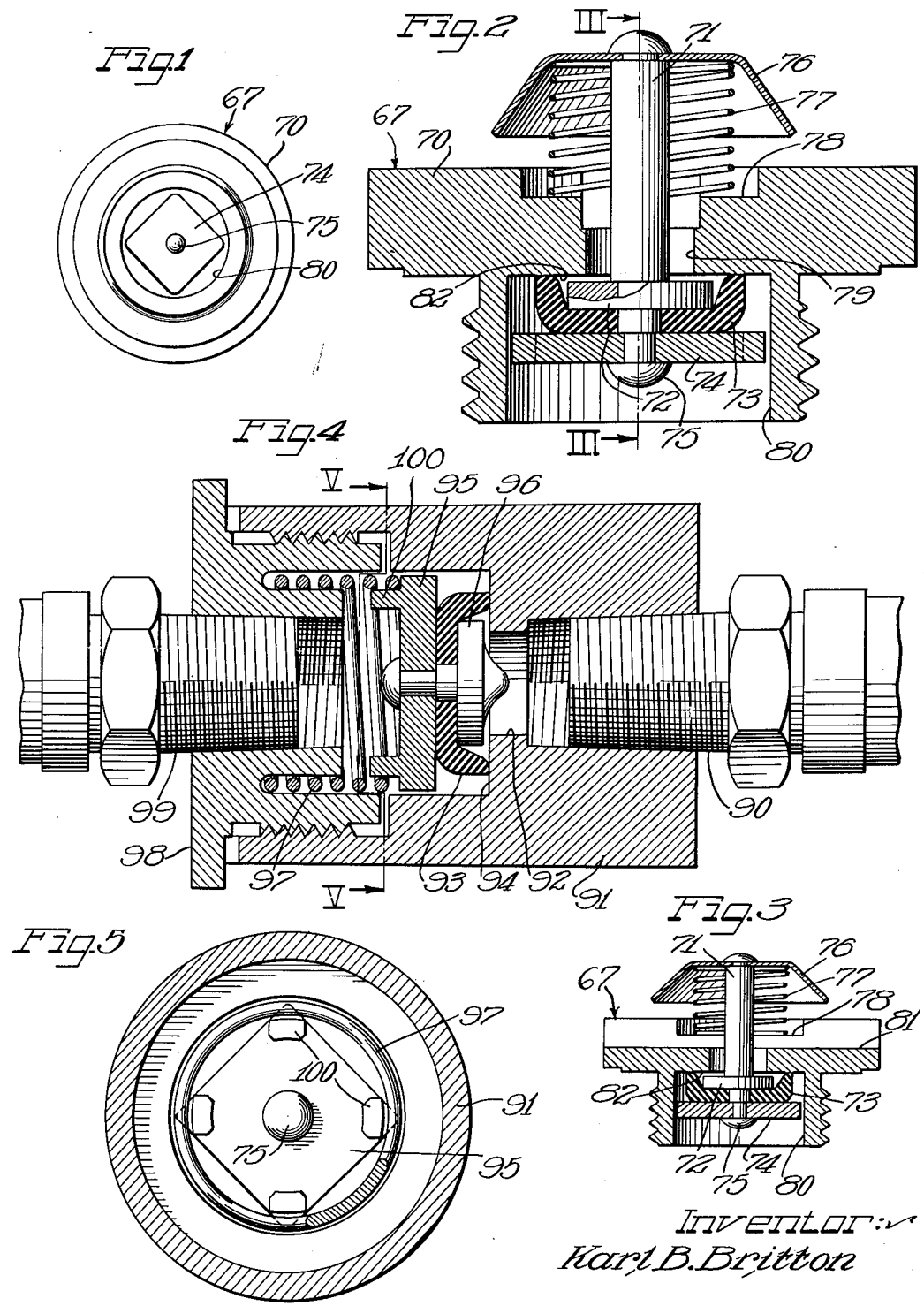

2,736,338
CHECK VALVE

Karl B. Britton, Bratenahl, Ohio

Original application June 23, 1948, Serial No. 34,723, now Patent No. 2,607,194, dated August 19, 1952. Divided and this application December 29, 1951, Serial No. 265,139

3 Claims. (Cl. 137—516.29)

This application is a division of my copending application entitled "Hydraulic System Actuator," filed June 23, 1948, Serial Number 34,723, now Patent No. 2,607,194, granted August 19, 1952.

This invention relates to improvements in check valves especially useful in hydraulic system actuators of the class known as master cylinders for operating hydraulic brakes on automobiles, airplanes and other vehicles.

It is, then, an object of this invention to provide a check valve adapted for brake system actuators and capable of sealing against high and low pressure back flow.

A further object of the invention is to provide a check valve which readily opens and is leak-proof.

A still further object of this invention is to provide a sensitive check valve having a first seal operating at low back pressures and a second seal operating at high back pressures and coacting with the first seal to render the valve leak-proof without sacrificing sensitivity of the valve.

A still further object of the invention is to provide a check valve which has a plate surface for closing the valve under high back pressures and a flaring lip annular surface for closing the valve under low back pressures.

Other objects and advantages of the invention will become apparent upon perusal of the following specification.

The principles and mode of operation of the invention are herein disclosed in connection with a preferred embodiment of the invention, but it should be understood that the invention is not limited to the details of construction shown in the drawings.

In the drawings:

Figure 1 is a bottom plan view of the check valve.

Figure 2 is a vertical sectional view, on an enlarged scale, of the check valve.

Figure 3 is a vertical sectional view on the line III—III of Figure 2, but on a reduced scale;

Figure 4 is a longitudinal sectional view of a slightly modified form of the check valve of the type shown in Figure 2, illustrating its application to a position in a through pipe line.

Figure 5 is a sectional view on the line V—V of Figure 4.

As shown in Figures 1 to 3 the check valve 67 comprises a plug 70 which is adapted to be threaded tightly into a threaded aperture. A valve stem 71 is provided with the spaced shoulders shown to carry and position near its lower end a circular plate 72, a rubber cup washer 73, and a bottom clamping plate 74. The riveted end 75 of the lower end of the valve stem 71 holds these two plates and the rubber cup washer securely in place. The upper end of the valve stem is also riveted over to hold a spring retainer cup 76 which holds in place the restoring spring 77, the lower end of which is based on the shoulder 78. A passage 79 through the plug 70 is in communication with the passage 80 only when the cup washer 73 has been displaced downwardly. The spring 77 is, as shown, a relatively light spring which will seat the upper edge of the cup washer 73 lightly against the shoulder surrounding the central passage 79.

As shown in Figure 3, a transverse passage 81 cut through the top face of the plug 70 will permit oil or other fluid to flow from a reservoir (not shown) receiving the plug through the passage 79 even though the spring retaining cup 76 be resting on top of the plug 70. In fact, the passage 81 is cut deep enough so that the oil may flow into the passage 79 without passing through the coils of the spring.

When used in connection with a brake system actuator, the light spring 77 permits the check valve to open in response to a slight drop in pressure below the cup washer 73, but when the pressure builds up within the passage 80 the cup washer will seat firmly and be expanded somewhat radially outwardly, the molded washer 73 being so shaped that it has no tendency to bend inwardly and thus be cut by the circular plate 72. Consequently, this check valve not only readily opens but also is leak-proof, not only under low pressure conditions but under high pressure conditions, that is, referring to back pressures tending to seat the check valve. In fact, any substantial back pressure will seat plate 72 against the margin 82 of passage 79, partially sealing the same, and making it impossible for rubber washer 73 to become entrapped over the top edge of plate 72.

Thus when there is only slight back pressure or no back pressure differential, the spring 77 will seat the washer 73 against the valve seat or margin 82. As the back pressure differential increases the flange portion of the washer will spread until the back pressure differential is sufficient to seat the valve plate 72 against the valve seat marginal portion 82.

A check valve constructed in accordance with the principles of the present invention is very sensitive and may be made to open and permit fluid flow with a minimum of negative pressure.

The expression "back pressure" and "back pressure differential" as used herein means the positive difference between the fluid pressure is a passage 80 and the fluid pressure in the passage 79. The expression "negative pressure" is used to denote the condition existing when the fluid pressure in the passage 79 exceed the fluid pressure in the passage 80.

As illustrated in Figure 1, the bottom retaining plate 74 is not circular as is the plate 72, but rather is generally square in shape so that past its flat sides oil may flow through the passage 80. Further, the plate 72 acts as a guide plate cooperating with the walls of the passage 80 to maintain the valve members concentric with the valve seat.

In Figure 4, there is shown how the check valve of this invention may be used in a pipe system. Here a conduit 90 is threaded into a valve housing 91 which is apertured at 92 for flow of a fluid. A rubber cup washer 93 normally seats against the shoulder 94 of the valve housing and is held properly connected to the spring loaded plate 95 by means of a retaining plate 96 riveted or otherwise suitably connected to the plate 95. The spring 97, disposed as shown to act on the plate 95, is bottomed at its other end against the valve housing plug 98 which in turn is connected with a conduit 99. A plurality of bosses 100 are provided on the plate 95 to act as pilots for the spring 97 and to permit fluid to flow around them from right to left when the valve is open.

It is apparent that this form of check valve may readily be used to control fluid flow through a pipe line and, because of the advantageous shape of the cup washer 93, will prevent back flow and leakage readily under both low and high pressure conditions.

There will be fluid flow through the check valve system of Figure 4 only under negative pressure conditions, however slight, depending upon the sensitivity of these systems as constructed in accordance with the principles of the present invention. Under slight back pressure or no back pressure conditions, these expressions are used in the same manner as they are used in connection with the system of Figures 1, 2 and 3, and the spring 97 will seat the flange portion of the washer 93 against the margin 94. High back pressure will seat the plate 96 against the margin 94 also, and the flange portion of the cup-shaped washer 93 will spread radially outwardly.

While I have shown and described herein in considerable detail preferred embodiments of the invention, it should be understood that the invention is subject to some variation and modification, differing from the details disclosed herein, without departing from the spirit and scope of the invention defined in the appended claims.

I claim as my invention:

1. A valve comprising a plug having a head portion with a central passage therethrough and a hollow exteriorly threaded shank portion providing a passage of larger diameter than the passage through the head portion, a valve seat between the passage in the head portion and the passage in the shank portion, a guide plate slidable in the passage of the shank portion, said guide plate coacting with said shank portion to provide for flow of fluid through the shank portion, a stem on the guide plate projecting through the passage in the head, concentric valves on said stem for coacting with said seat, one of said valves projecting beyond the other of said valves to contact said seat before the other of said valves and being deformable into flush relationship with the other of said valves, a cap on said stem adapted to seat on the outer face of the head of said plug, a spring surrounding the stem between the cap and head of the plug for urging the valve into closed position, and a groove in said plug head communicating with the passage in the head to facilitate flow to and from said passage even when the cap is seated on the plug head.

2. A valve comprising a passaged plug having a valve seat in the passage thereof, a stem in said passage projecting beyond one end of the plug, a cap on the projecting end of said stem, a spring between the cap and plug, a guide in said passage on said stem for centering the stem in the passage, and a pair of concentric valves on said stem coacting with said seat, said valves including a first deformable annular valve and a second valve inside of said first valve, said first valve adapted to engage the valve seat in advance of the second valve and being deformable under increased pressure into a flush relationship with the other of said valves to accommodate seating of the second valve against the seat, and said spring urging said first valve into seated relation with the valve seat.

3. A check valve adapted to open and close in accordance with slight pressure variations and adapted to seat as a double valve under high pressure conditions and as a single valve under low pressure conditions and no pressure conditions comprising a body member, said body member having a stepped annular aperture extending longitudinally therethrough providing a series of concentric shoulders, one of said shoulders forming a valve seat, a valve stem extending through said aperture, a pair of plates, a resiliently deformable flanged washer carried between said pair of plates and secured to one end of said valve stem, a third plate secured to the other end of said valve stem, a coil spring surrounding said valve stem between said third plate and another of said shoulders urging said valve stem in a direction to seat the flanged washer on the valve seat, said flanged washer being flared radially outwardly and normally radially surrounding and projecting axially beyond one plate of said pair and toward said third plate, said washer and said one of said pair of plates each having a diameter greater than the diameter of said aperture surrounded by said valve seat, whereby under slight back pressure and no back pressure conditions said flanged washer will be seated against said valve seat as a single valve and under high back pressure conditions both said washer and said one of said pair of plates will be seated against said valve seat to form a double valve.

References Cited in the file of this patent

UNITED STATES PATENTS

| | | |
|---|---|---|
| 874,652 | Bailey | Dec. 24, 1907 |
| 1,779,421 | Cox | Oct. 28, 1930 |
| 1,886,158 | Brown | Nov. 1, 1932 |
| 2,131,928 | Abegg | Oct. 4, 1938 |
| 2,178,876 | MacClatchie | Nov. 7, 1939 |
| 2,233,649 | Stahl | Mar. 4, 1941 |
| 2,263,750 | Willke | Nov. 25, 1941 |
| 2,373,886 | Geiger | Apr. 17, 1945 |
| 2,431,769 | Parker | Dec. 2, 1947 |
| 2,482,198 | Melichar | Sept. 20, 1949 |
| 2,495,880 | Volpin | Jan. 31, 1950 |
| 2,524,129 | Klein | Oct. 3, 1950 |
| 2,610,021 | Smith | Sept. 9, 1952 |
| 2,628,810 | Moore | Feb. 17, 1953 |